July 5, 1955     W. P. BRUESTLE     2,712,376
TRAY LOADER

Filed Sept. 29, 1950     3 Sheets-Sheet 1

INVENTOR.
William P. Bruestle.
BY
Wood, Arey, Herron & Evans.
ATTORNEYS.

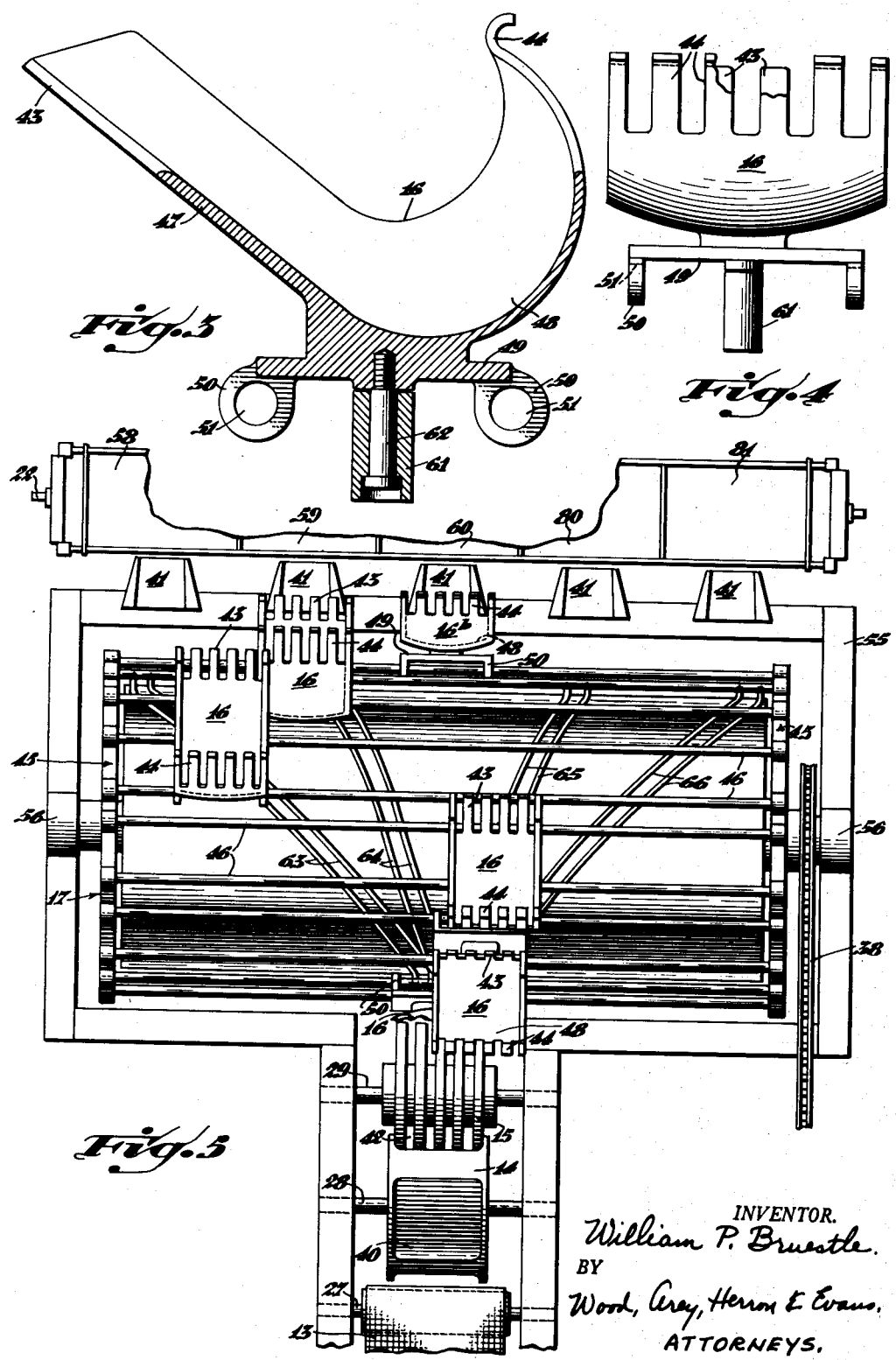

July 5, 1955  W. P. BRUESTLE  2,712,376
TRAY LOADER
Filed Sept. 29, 1950  3 Sheets-Sheet 3
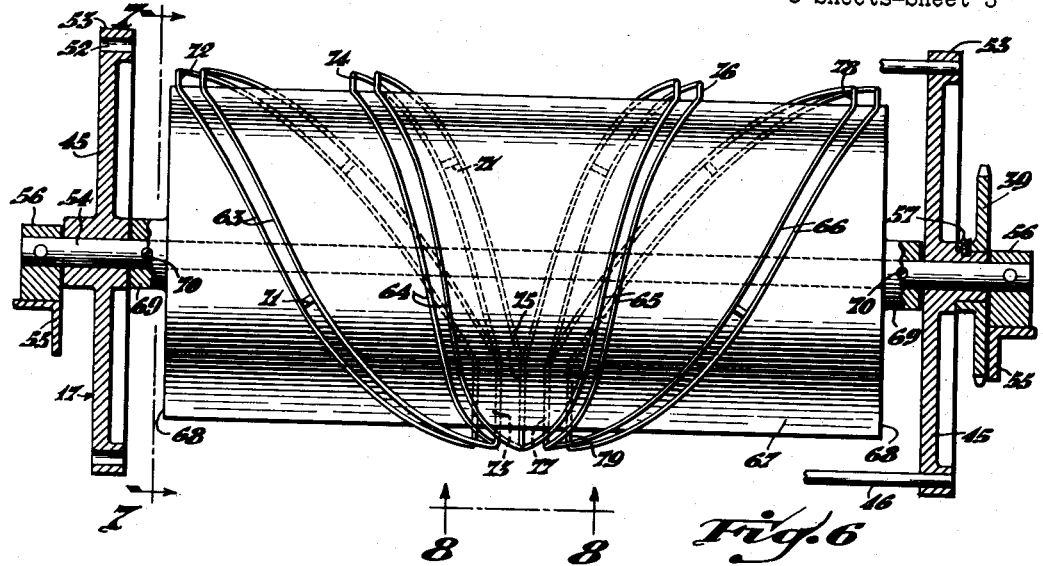
Fig. 6
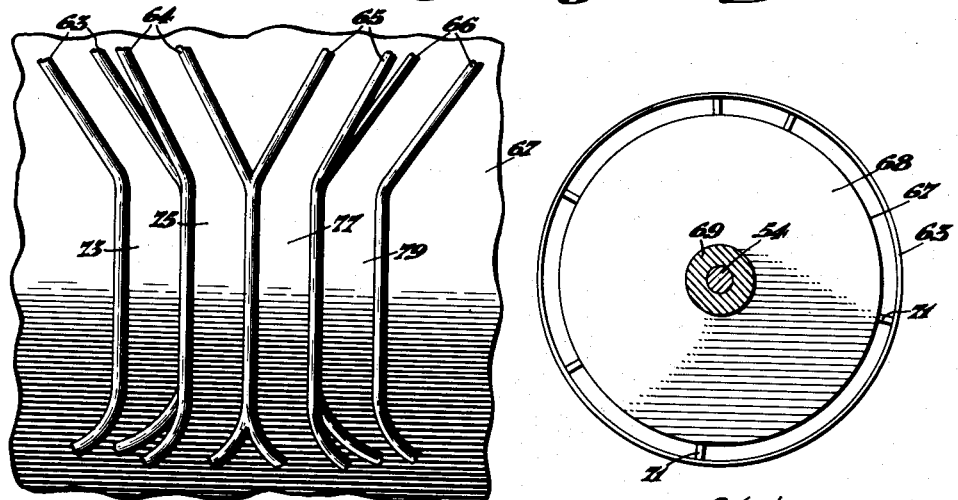
Fig. 8
Fig. 7
INVENTOR.
William P. Bruestle.
BY
Wood, Arey, Herron & Evans
ATTORNEYS.

United States Patent Office 2,712,376
Patented July 5, 1955

2,712,376

TRAY LOADER

William P. Bruestle, Cincinnati, Ohio, assignor to The J. H. Day Company, Inc., Cincinnati, Ohio, a corporation of Ohio Application September 29, 1950, Serial No. 187,620

3 Claims. (Cl. 198—31)

This invention relates to apparatus for depositing lumps of dough in trays preparatry to proofing and is particularly directed to a novel means for rapidly loading several lumps of dough in each tray as it moves past the loading device on a constantly moving conveyor.

While the present invention is disclosed in an embodiment used to load dough lumps as they are discharged from a rounder into proofer trays, it will be understood that the embodiment shown may be altered so that it may also be used to load trays in other applications where similar problems of timing and spacing exist.

In a large scale bakery where bread, rolls and the like are produced by quantity production methods, the dough is first separated into lumps by a divider and the lumps are rounded into balls by a machine, known as a rounder, after which the balled lumps are transferred to a proofer which consists of a chamber through which elongated trays, each containing several lumps of dough are slowly passed on a continuously moving conveyor. During the travel through the proofer, the dough lumps which have been subjected to severe strains in the rounder, are conditioned and the cells given a chance to recuperate before the lumps are shaped in the molder.

The trend in the baking industry in recent years has been to increase production by increasing the capacity of the individual machines rather than by increasing their number. Thus, high speed dividers and rounders have been introduced which are capable of forming dough lumps at rates upwards of 150 per minute. To accommodate these lumps during proofing, proofers of greater capacity, having hundreds of elongated trays, each carrying a plurality of dough lumps, have been provided.

In order to achieve a sustained high rate of production however, it is necessary not only that each machine have a large capacity but since the machines are interdependent, their output must be perfectly coordinated. The rounder, for instance, must be able to round up each dough lump as it is received from the divider and the loader must be capable of unerringly transferring the lumps, as they are discharged from the rounder, to proofer trays which are passing the loader at the correct rate so that a sufficient number of empty trays is available to receive the lumps being discharged from the loader.

The transfer of dough lumps from the rounder to the proofing trays is made especially difficult by the operation of several factors; in the first place, the dough being transferred is in a plastic state and has a tendency to adhere to anything with which it comes in contact or to become impaled upon any sharp surface upon which it comes to rest. Furthermore, while the proofer trays are moving at a constant rate, the dough lumps, which are to be loaded into the trays, are discharged from the rounder at slightly varying rates. Finally, even slight variations in humidity and temperature, which are normally encountered, affect the behavior of dough lumps so that any sort of lump movement depending upon gravity is likely to be very erratic.

It is apparent that the function of the loader is really dual in nature, for it must not only receive lumps of dough from the rounder and deposit them in a spaced relationship within the proofer trays but it must also serve as the correlating means between the rounder output and proofer input. That is, the loader must be adapted to receive dough lumps from the rounder at a slightly irregular rate and deliver them to the proofer at a constant rate while preventing the lumps of dough from becoming jammed either in the loader, or due to the formation of "doubles" in some subsequent device. The consequence of a failure of the proofer to prevent such a jam is that the whole production line need be shut down while the jam is cleared and the timing difficulties corrected.

The present invention, therefore, is predicated upon the concept of providing a proofer loading mechanism which will positively control the movement of dough lumps as they are received from a rounder and deposit them into proofing trays as they pass the loader in such a manner that a specified number and only that number of lumps of dough will be deposited in an accurately spaced relationship within each tray and any possibility of the lumps jamming or forming "doubles" is removed.

Generally, the loader consists of a lump spacer and a transfer wheel which cooperate to feed the dough lumps in timed succession to the loading drum which deposits them in the proofing trays. The loading drum which functions to pick up the lumps and deposit them in the trays is constructed so that it can load a plurality of dough lumps into each of two trays during each revolution of the loader. This allows the loading drum to be rotated at a speed much lower than that of a drum rotating once or perhaps several times to fill each tray, and thus helps solve one of the problems arising as a result of the higher rate of production, namely that the speed of rotation of loading machinery has reached a point where the centrifugal force acting upon the plastic dough lumps is of such a magnitude that the dough lumps have a tendency to flatten and adhere when striking a surface as they are discharged from the rapidly rotating drum. Thus the effect of this slower speed is that the dough lumps are much less likely to become impaled on or stuck to any part of the transfer mechanism, than would be the case with a high speed drum.

One object of this invention then is to provide a loading apparatus having a loading drum adapted to load a plurality of dough lumps into each of two trays during one complete revolution of the drum.

A further object of this invention is to provide a loading device in which the movement of dough lumps is positively controlled from the time they are discharged from the rounder until they are positioned above the tray into which they are to be deposited.

An additional object of this invention is to provide a loading mechanism which will prevent lumps of dough from becoming jammed in the loader.

A further object of this invention is to provide a loader which will accurately position several lumps of dough within each tray without the aid of long gravity feed chutes whereby the dough lumps require less flour to prevent sticking.

These and other objects and advantages will be apparent from a consideration of the specification in conjunction with the drawings in which:

Figure 3 is a longitudinal cross sectional view, on an enlarged scale, showing one of the article holders or loader cups featured in the apparatus.

Figure 4 is a reduced-scale view of the article holder or loader cup, as viewed from right to left on Figure 3, part being broken away.

Figure 5 is a top plan view of the apparatus illustrated by Figure 2, parts of the frame being broken away.

Figure 6 is an elevational view of the drum-like cup carrier, with the loader cups omitted and parts shown in cross-section, to illustrate details of construction.

Figure 7 is a cross-sectional view taken on line 7—7 of Figure 6.

Figure 8 is an enlarged fragmental elevation taken on line 8—8 of Figure 6.

Figure 1:
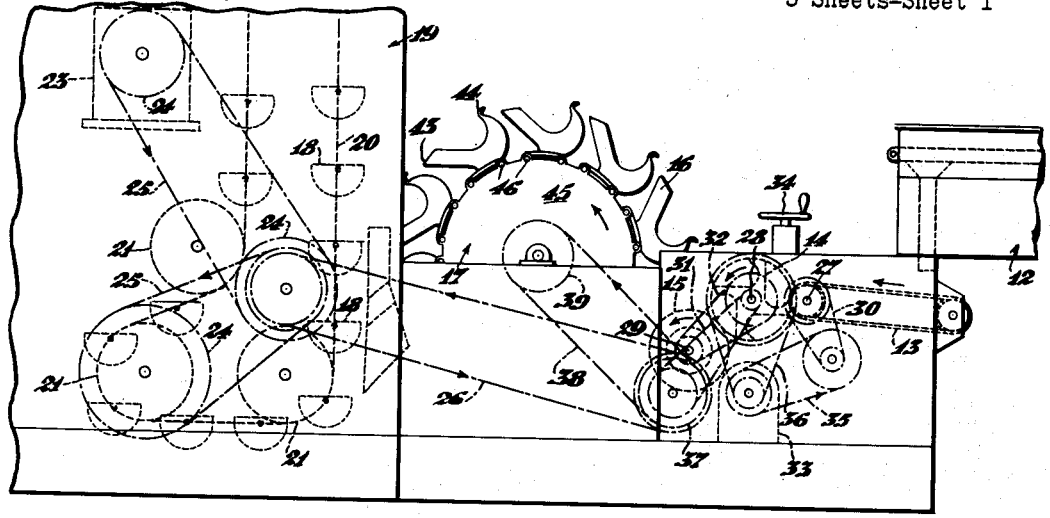
Figure 1 is a side elevational view in diagrammatic form, showing the tray loading apparatus of the invention.

With reference to the drawings, 12 indicates generally a rounder from which dough lumps are delivered with more or less regularity, onto a continuously moving conveyor 13 which may be in the form of an endless belt as shown. The conveyor 13 deposits the lumps one by one into spaced pockets of a lump spacer 14, which in turn delivers them in timed succession to a rotating wheel or drum 15 that transfers the lumps into a succession of loader cups or article holders 16. The elements 16 are mounted in a certain way to be described, upon a loader drum or carrier indicated generally at 17, which effects delivery of the lumps in groups, to one of a series of trays or receivers 18 constituting part of a proofing apparatus 19. That much of the proofing apparatus as is shown upon Figure 1, is the elevator section thereof comprising a pair of moving conveyor chains 20 trained over sprockets 21—21—21, and supporting opposite pivotal ends of the trays 18 at the studs 22 (Figure 5), so that the trays may remain level and in upright position as the chains carry them about the sprockets and through the proofer. The details of this are immaterial to the present invention and need not be described herein, as proofer constructions are well known in the art. The proofer elevator may be driven by a reduced-speed motor 23 through the agency of the usual sprockets and chains 24—25, or otherwise. Another chain or other motion transmitting device 26 may be employed to drive the remainder of the apparatus shown at the right of the proofer.

The drive arrangement for the conveyor 13, lump spacer 14, and the transfer wheel or member 15, requires no particular or detailed explanation. It is sufficient to point out that these elements are mounted on shafts 27, 28, and 29, respectively, which are all rotated in a counter-clockwise direction by means of suitable sprockets driven by chains 30, 31, 32. A speed changer 33, regulated by means of a controller 34, provides for infinite adjustments of the speed of conveyor 13, which is driven by means of belts or chains 35 and 30. The speed changer may be driven by chain 36, or otherwise. The chain 26, which drives the shaft of a sprocket 37, effects a drive to the cup carrier or drum 17 through the agency of a chain 38 and sprocket 39, as most clearly illustrated by Figures 5 and 6. The drives for the various parts are simple and conventional, requiring no extended explanation. Moreover, they are subject to alteration and substitution of equivalents, within the scope and spirit of the invention.

Figure 2:
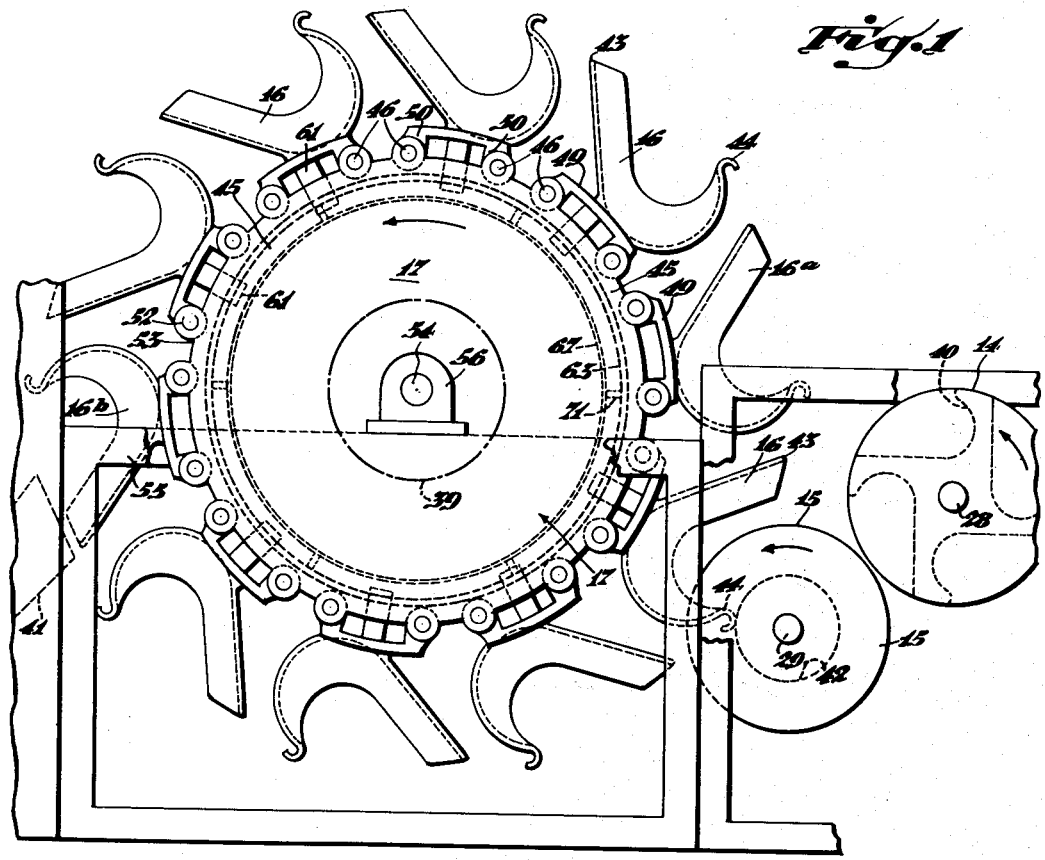
Figure 2 is an enlarged side elevation of the central portion of the apparatus, with certain details emphasized.

Referring to Figures 2 and 5, the spacer member 14 will be seen to comprise a drum-shaped body provided with a series of peripheral cavities or pockets 40 arranged to receive individual dough lumps successively from the conveyor 13, and dump them onto the upper peripheral portion of the transfer wheel 15. By properly regulating the speed of conveyor 13, the feed of dough lumps from the rounder or baller 12 may be so controlled as to have a lump available for every pocket of the spacer drum as the drum rotates.

The spacer member and transfer wheel rotate in a common direction, and the driving arrangement is such that the transfer wheel 15 has a faster peripheral speed than the spacer member or drum 14, so that a lump dropped onto the wheel 15 will be rather rapidly projected or thrown toward a cup or holder 16 of the carrier 17. This action occurs at what may be termed the article feeding station. At the opposite side of the carrier 17, where the cups or holders discharge their contents into the trays or receptacles 18 (Figure 1), by way of chutes or guides 41, is the so-called discharging station.

In the preferred form of transfer wheel 15, the periphery is grooved annularly as at 42, the grooves providing spaces through which may pass the groups of correspondingly spaced fingers 43 and 44 formed at the leading and trailing ends of the cups or article holders 16. As Figure 2 indicates, the group of fingers 44 passing through the grooves 42 of transfer wheel or drum 15, constitutes a positive means of dislodging the dough lumps from said wheel or drum. As previously stated, however, the speed of rotation of the wheel or drum may be sufficient to cast the dough lumps immediately into the cups or holders, as the lumps touch the wheel upon leaving the spacer drum. Whether the dough lumps are thrown into the cups or are picked from the drum by the cup fingers, the transfer wheel serves to prevent the jamming of dough lumps as they are loaded into the cups or article holders. For, it will be apparent from Figure 2 that if the spacer member 14 were feeding the lumps directly into the cups 16 and the two were rotating slightly out of phase or lumps of dough adhered momentarily to the spacer pocket, the lumps might become jammed at the loading station. It is also apparent from Figure 2 that by dropping the lumps of dough upon the transfer wheel that this danger is eliminated, since the fingers 44 can pick any lump from a greater portion of the periphery of the transfer wheel than would be possible if the cup were receiving the lumps from the spacer directly. This is due to the higher speed of rotation of the transfer wheel than the spacer member and means that even if a lump of dough is dropped onto the wheel slightly before or after the time it is normally deposited to be picked up by the cup, it will nevertheless not jam the loader but will either be thrown into the cup or picked from the wheel by the cup fingers. Thus, by feeding the cups from a transfer wheel, if the spacing member should be rotating slightly out of phase with the loader or if the lumps adhere momentarily to the spacer, the action of the transfer wheel will serve to automatically compensate for these conditions. The construction as specified thereby ensures maintenance of a regular and positive feed of dough lumps to the cups or holders 16 as the structure 17 rotates in counterclockwise direction.

From the foregoing, it will be understood that the arrangement described provides a single straight-line feed for dough lumps at the charging or feeding station of the machine.

The loader drum structure which carries the series of article holders or cups 16, comprises a rotary cage-like body assembled from a pair of spaced wheels or discs 45—45 connected together along the peripheries thereof by a series of spaced parallel rods or bars 46 fixed at their opposite ends to said discs. The rods or bars provide track means or guides on which the cups 16 may be shifted toward and from the end wheels or discs 45. Referring to Figures 3, 4, and 5, it will be noted that each cup or article holder 16 may comprise a body of rigid material, of which metal is an example, shaped in much the manner of the letter J. The leading edge formed by the spaced fingers at 43, is an extension of a wall 47, U-shaped in transverse cross-section and upstanding from the pocket portion 48 of the holder. Said wall 47 may be considered as being disposed substantially at right angles to the pocket base or bottom, and extending as a continuation thereof so that articles placed in the pocket may roll outwardly along wall 47 when the wall is inclined downwardly from the pocket.

The cup or article holder may include a platform 49 disposed at an acute angle to the wall 47, the platform carrying pairs of spaced perforate ears 50—50. The ears preferably depend from the four corners of the platform, and their bores or perforations 51 are dimensioned to slidably receive two adjacent rods or bars 46 which form a pair, or a complete track. The platform may be an integral part of the article holder or cup as shown, although in practice it may be applied as a separate part, to simplify manufacture and assembly. In either case, the platform is a rigid part of the article holder and may slide along the track as previously pointed out. The ends of the rods 46 which form the tracks, may be suitably secured in the perforations 52 at the rims 53 of the end discs 45, to furnish a rigid cage structure.

It may be noted that the cage structure above described is adapted for rotation upon a central shaft 54, the opposite ends of which are anchored to the machine frame 55 through the intermediary of pillow blocks or pads 56. The shaft thereby is rendered non-rotatable, and the end discs or wheels 45—45 have a bearing fit thereon permitting rotation of the cage by means of the sprocket 39 which is fixed at 57 to the hub of one of the discs or wheels 45. The cage in its rotational movement carries with it the series of article holders or cups 16, so that the holders or cups are alternately inverted and righted, with each full cycle of rotational movement of the cage.

Means are provided for shifting the holders or cups toward and away from the ends of the cage, along the tracks 46, as the cage rotates. The purpose of this shifting movement of the cups, is to bring each cup into register with the feeding station 14—15 for reception of a dough lump, and then shift the cup a predetermined distance axially of the cage, to align same with one particular section or area of a tray or receptacle 18 into which the dough lump is to be discharged when inverted. Thus, a given cup will shift always from the charging station, near the center of the drum or cage, a given distance axially of the cage, to deposit its contents onto a particular area or section of a tray at the discharging station. For example, referring to Figure 5, the cup at the extreme left of the drawing will always shift from the feed line 14—15, into alignment with the first section 58 of tray 18, upon each approximate half-rotation of the carrier 17, and upon inverting and so dumping its contents, will pass underneath the structure and return to the feed line for a subsequent charge. In like manner, the next adjacent cup will always discharge into the second compartment or section 59 of the tray, and so on with all the cups or article holders of the system. Incidentally, the third cup from the left is shown sufficiently tilted or inverted to dump its contents into the middle tray compartment or section 60; but it may be noted that this cup, being always in line with both its tray section and the feed elements 14—15, requires no shifting axially of the cage member and may therefore be made fast to the rods 46 which carry it.

The means for shifting the article holders or cups 16 as above related, may be in the form of stationary cams located interiorly of the cage structure and adapted to guide the cups through the agency of cam followers carried by the cups. The followers, indicated at 61, may be simply in the form of elongate rollers or cylinders projecting from the cases of the platforms 49, substantially at right angles thereto. The followers may be rotatable upon studs 62, as suggested by Figures 3 and 4, but are not necessarily so mounted. The requirement of the follower is that it be extended sufficiently beyond the platform to engage the shift cam.

The cup or article holder shifting cams are best illustrated in Figures 6 and 7. As shown, there are four cams, numbered 63, 64, 65 and 66, each consisting of a pair of spaced rods. The rods of cam 63 form two continuous substantially circular loops with a uniform space between them sufficiently wide to loosely accommodate a follower such as 61. The rods of the cam may be mounted upon any suitable stationary framework so as to be always in control of the follower of a cup or article holder. As shown herein by way of example, the support for the cam rods is in the form of a cylinder 67 having opposite ends 68—68 furnished with hubs 69 to be supported upon shaft 54. The hubs are fixed to the stationary shaft, as by screws 70 or other means.

The rods of cam 63 are supported upon the curved surface of the cylinder, and at a distance therefrom, by means of a series of spacers 71 welded or otherwise secured to the rods and the cylinder. The spacers may be in the form of U-shaped straps with the ends of the legs welded to the rods, and the base of the U welded to the cylinder surface so that no part of the spacer may interfere with free movement of the follower 61 between the cam rods. With the exception of two short straight sections indicated at 72 and 73, the rods of cam 63 form two half helices about the cylinder, one beginning at the straight section 73 of Figure 6 and extending toward the end of the cylinder, and the other beginning at the straight section 72 and extending inwardly toward the middle portion of the cylinder. One helical section is right hand and the other is left hand, and their ends are joined at the straight sections to render the cam track continuous.

From the foregoing explanation, it may be understood that a cup element such as 16 placed on the cam track 63 of Figure 6, with its follower disposed between the rods constituting the cam, would be guided to travel from straight section 72 as a starting point, down the back of the cylinder and inwardly toward the straight section 73, then up the front of the cylinder and outwardly to the starting point 72. In like manner, a cup similarly placed on cam track 64 would travel from a starting point at straight section 74, down the back of the cylinder along a helical path to the straight section 75, thence up the front of the cylinder and helically outwardly to the starting point 74. The same applies to followers traveling the cams 65 and 66, which have straight sections 76, 77, 78 and 79.

The straight sections 72, 74, 76 and 78 of the cup shifter cams are spaced apart in correspondency with the tray sections of Figure 5, indicated at 58, 59, 80 and 81, and establish momentary pause points for the cups or article holders upon reaching the discharging station. The pause occurs only in the shift of the cups axially of the cylinder, and not in the rotary advancement. Its purpose is to permit linear expulsion of the dough lumps from the cups to the chutes 41, free of any tendency to sidewise throw.

At the straight sections 73, 75, 77 and 79 of Figure 6, the rods converge to form four parallel and adjacent straight camways, as detailed in Figure 8, where the cups are brought successively to the middle portion of the cylinder in position to receive dough lumps from the charging station. Preferably, the cups are slightly offset with respect to their followers to compensate for the small distance the outer tracks are off center at the loading station. After charging, the cups follow their respective cams to their respective discharging positions. At the points of convergency of the various cam rods, best illustrated by Figure 8, welds may be employed to effect the junction points.

As was previously pointed out, no cam is needed for that cup which discharges into the middle compartment 60 of tray 18, for the reason that such cup is on the center-line of the feeding or charging station and therefore requires no axial shifting. Two such cups are included in the system illustrated, one being at 16a and the other at 16b of Figure 2, on opposite ends of a diameter of the carrier drum. The remaining cups are duplicated also, there being a total of ten, two arranged for control by each of the cams 63, 64, 65 and 66. Under this arrangement, two successive proofer trays can be charged with dough lumps at each full rotation of the carrier 17.

In the event that each proofer tray is to be charged with only four dough lumps, rather than five, the stationary cups 16a and 16b may be eliminated.

It may then be desirable to move the cam tracks 64 and 65 closer together at the straight sections 74 and 76, until all the straight sections 72, 74, 76 and 78 are equally spaced apart. The proofer trays will then be loaded with the dough lumps equally spaced therein.

The cup or article holder carrier arrangement is subject to modification for adaptation to varying circumstances. For example, it may sometimes be desirable to load the proofer trays, or some other type of receptacle, with six articles rather than five or four as above explained. When six are to be handled, the number of cams upon the cylinder may be increased to six, in order to control six or twelve loader cups. The number of loader cups employed must either be equal to the number of lumps accommodated by each receptacle at the discharging station, or a multiple of that number. A preferable practice is to apply to the cup carrier a number of cups or article holders equal to twice the capacity of the proofer tray or other receptacle located at the discharging station. Under such a condition, a complete loading cycle for loading one tray is constituted by a half rotation of the cup carrier 17. In any construction wherein the number of loader cups on the carrier would equal the number of articles accommodated by the receptacle at the discharging station, a loading cycle would be constituted of one full rotation of the loader cup carrier.

It is conceivable that the device herein disclosed might be operated by oscillating the loader cup carrier 17 instead of rotating it. It is quite possible also to utilize a plain drum as a transfer element in place of the grooved drum 15, and thereby dispense with the fingers 43 and 44 at the leading and trailing ends of the cups or article holders. The various chutes 41 may be supported upon the machine frame at different elevations above the base of the machine, to compensate for movement of the proofer trays while loading them. These and many other modifications and changes in structural details of the apparatus may be resorted to, within the scope of the appended claims, without departing from the spirit of the invention.

Having described my invention, I claim:

1. A tray loading mechanism comprising, a drum-like body rotatable about its longitudinal axis, receiving means for dough lumps on one side of the axis, a feeding means for dough lumps on the opposite side of the axis, a series of lump holders shiftable upon the body between the feeding means and the receiving means, means for shifting the article holders divergently in succession from a common point at the feeding means to a series of spaced locations at the receiving means, as the drum-like body rotates, said feeding means for lumps comprising a transfer wheel rotating in the same direction as the drum-like body but at a higher speed, and in alignment with the common point at which the lump holders converge, the speed of rotation of said wheel urging said lumps into the holders, and a spacer element timed with the lump holder movements, for depositing lumps with spaced regularity upon the periphery of the transfer wheel.

2. A device for loading proofer trays and the like comprising in combination, a frame, a drum-like carrier having a plurality of spaced tracks, a series of loader cups slidably mounted upon said tracks, each cup being in the form of an open pocket having a slotted bottom and an adjacent wall upstanding from said bottom to support a dough lump, means preventing rotation of said cups with respect to said carrier, whereby through one portion of carrier rotation the cups may support dough lumps, but through the remaining portion of such rotation the cups are inverted to discharge the lumps, means operative during rotation of the carrier to shift the cups along the tracks predetermined distances from the middle portion of the carrier while the cups are retentive of dough lumps, and to return the cups to the middle position while the cups are inverted, a relatively rapidly rotating transfer wheel annularly ribbed to interfit with the slots of the cup bottoms at the receiving position of the cups for feeding dough lumps individually to the cups, the direction of rotation of said transfer wheel being the same as that of the carrier, and conveyor means receiving the lumps released by the cups when inverted.

3. In a tray loading mechanism having a rotary loading drum and a series of cups carried by said drum, said cups being provided with fingers along one edge thereof, means for successively loading said cups with lumps of dough, said means comprising, a rotary spacing member having a plurality of pockets spaced equi-distantly about its periphery, a transfer wheel adapted to receive dough lumps from said spacing member, said transfer wheel having a series of peripheral grooves through which the fingers of said cups may pass, whereby said lumps of dough are picked from said transfer wheel and deposited in said cups.

References Cited in the file of this patent

UNITED STATES PATENTS

| Number | Name | Date |
|---|---|---|
| 738,937 | Prince | Sept. 15, 1903 |
| 1,202,171 | Fellizianetti | Oct. 24, 1916 |
| 1,768,482 | Koch | June 24, 1930 |
| 1,890,740 | Marasso | Dec. 13, 1932 |
| 1,997,013 | Potthoff | Apr. 9, 1935 |
| 2,064,437 | Marasso | Dec. 15, 1936 |
| 2,146,151 | Marasso | Feb. 7, 1939 |
| 2,493,942 | Bingham | Jan. 10, 1950 |